United States Patent
Fan et al.

(10) Patent No.: US 12,079,323 B2
(45) Date of Patent: Sep. 3, 2024

(54) TAMPERING DETECTION METHOD AND APPARATUS AND NON-TRANSITORY COMPUTER-READABLE STORAGE MEDIUM

(71) Applicants: Xiaojing Fan, Beijing (CN); Wei Wang, Beijing (CN); Jinting Hou, Beijing (CN); Luyun Qin, Beijing (CN); Fang Wang, Beijing (CN)

(72) Inventors: Xiaojing Fan, Beijing (CN); Wei Wang, Beijing (CN); Jinting Hou, Beijing (CN); Luyun Qin, Beijing (CN); Fang Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/015,342

(22) Filed: Sep. 9, 2020

(65) Prior Publication Data

US 2021/0073369 A1 Mar. 11, 2021

(30) Foreign Application Priority Data

Sep. 11, 2019 (CN) .......................... 201910856999.2

(51) Int. Cl.
*G06F 21/00* (2013.01)
*G06F 21/44* (2013.01)

(52) U.S. Cl.
CPC .................................. *G06F 21/44* (2013.01)

(58) Field of Classification Search
CPC ..................................................... G06F 21/44
See application file for complete search history.

(56) References Cited

U.S. PATENT DOCUMENTS 9,855,785 B1 1/2018 Nagelberg et al.
2003/0103645 A1* 6/2003 Levy .................. H04N 1/32251
707/E17.112

(Continued)

FOREIGN PATENT DOCUMENTS

EP 3413507 A1 12/2018
WO WO-2017136879 A1 * 8/2017 ........... G06F 21/645

OTHER PUBLICATIONS

Mthethwa, S. et al. "Proposing a Blockchain-based Solution to Verify the Integrity of Hardcopy Documents." 2018 International Conference on Intelligent and Innovative Computing Applications (ICONIC), IEEE, Dec. 6, 2018: pp. 1-5.

(Continued)

*Primary Examiner* — Rodman Alexander Mahmoudi
(74) *Attorney, Agent, or Firm* — Harness, Dickey & Pierce, P.L.C.

(57) ABSTRACT

Disclosed is a tampering detection method applied to one of multiple entities involved in a paper copy transfer process. The method includes steps of obtaining an optically readable copy of a paper copy; acquiring a verification code detection result of the optically readable copy; if the verification code detection result contains no verification code, then determining that the paper copy has been tampered with; and in a case where the verification code detection result contains a verification code and a print transaction ID associated with the verification code, attaining, based on the print transaction ID, a print transaction corresponding to the print transaction ID, and performing comparison on the optically readable copy and information contained in the print transaction so as to determine whether the paper copy has been tampered with. Each of the plural entities corresponds to a node in a distributed data network.

13 Claims, 5 Drawing Sheets

(56) References Cited

U.S. PATENT DOCUMENTS

| | | | |
|---|---|---|---|
| 2008/0015879 A1* | 1/2008 | Sennott | G06Q 30/0279 |
| | | | 705/313 |
| 2009/0034787 A1* | 2/2009 | Sato | H04N 1/32149 |
| | | | 382/100 |
| 2012/0206758 A1* | 8/2012 | Gibson | G06F 21/64 |
| | | | 358/1.14 |
| 2017/0329996 A1* | 11/2017 | Wilson | G07D 7/202 |
| 2018/0068280 A1* | 3/2018 | Micali | G06Q 20/29 |
| 2018/0097782 A1* | 4/2018 | Falk | H04L 63/0428 |
| 2018/0367701 A1* | 12/2018 | Saito | H04N 1/32778 |
| 2019/0289019 A1* | 9/2019 | Thekadath | G06F 16/27 |
| 2020/0259633 A1* | 8/2020 | Gallagher-Lynch | |
| | | | H04L 9/3239 |

OTHER PUBLICATIONS

Extended European Search Report dated Jan. 27, 2021 issued in corresponding European Appln. No. 20195092.0.

* cited by examiner

TAMPERING DETECTION METHOD AND APPARATUS AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) Chinese Patent Application No. 201910856999.2 filed on Sep. 11, 2019, in the Chinese Patent Office, the entire disclosure of which is hereby incorporated by reference herein.

BACKGROUND OF THE DISCLOSURE

1. Field of the Disclosure

The present disclosure relates to the technical field of document management security, and more particularly relates to a method and apparatus for detecting tampering from a paper copy as well as a non-transitory computer-readable storage medium.

2. Description of the Related Art

Nowadays, various documents are created as electronic data, and are managed and processed. Printing electronic documents is a daily function; users may print electronic documents as a part of their daily work or record keeping.

Also, with the advancement of communication systems, people often send electronic documents as attachments to others. Because these documents are in electronic form, they may be easily edited at any time. In other words, anyone may change the contents (or other attributes) of the electronic documents before printing them.

When an electronic document to be printed is a document that requires high security, such as a contract document, it is more important to verify whether the paper copy of the electronic document has been tampered with. For example, in a secure contract management system, a contract needs to be printed as a paper copy, and seals need to be passed among multiple entities (also called "parties"; e.g., different companies and organizations) involved in the contract. However, there is a risk of tampering with the contract in the passing process. As such, a system is needed to verify whether a printed paper copy is a true copy of the original document or whether it has been tampered with.

In conventional technologies, a single server may be used to control printing and verifying an electronic document, and the verification information related to the electronic document may be stored on the server. However, the problem with this solution is that because the verification information is stored on a single server, there is a risk of single-point tampering with the verification information. For example, if the server is hacked, then the verification information stored on the server may be tampered with.

Additionally, if the server is managed and maintained by one of the multiple entities involved in a contract, then there is a problem that in the process of passing the paper copy of the contract among the multiple parties, the multiple entities cannot trust mutually, thereby resulting in verification failure.

SUMMARY OF THE DISCLOSURE

In light of the above, the present disclosure provides a tampering detection method and apparatus by which it is possible to solve the problem of trust in a cross-entity paper copy verification process as well as a non-transitory computer-readable storage medium.

According to a first aspect of the present disclosure, a tampering detection method is provided that is applied to one of a plurality of entities involved in a paper copy transfer process. The tampering detection method includes steps of obtaining an optically readable copy of a paper copy; acquiring a verification code detection result of the optically readable copy; if the verification code detection result does not contain a verification code, then determining that the paper copy has been tampered with; and in a case where the verification code detection result contains a verification code and a print transaction identifier (ID) associated with the verification code, attaining a corresponding print transaction based on the print transaction ID, and comparing the optically readable copy with the information contained in the print transaction so as to determine whether the paper copy has been tampered with.

Each of the plurality of entities corresponds to a node in a distributed data network, and each node in the distributed data network is used to send/receive data to/from the other nodes in the distributed data network and to receive/send a review result with respect to the data from/to the other nodes. The data obtaining its required review result is synchronously recorded on each node in the distributed data network. The data recorded on each node in the distributed data network is used to check tampering with the data recorded on the other nodes in the distributed data network, and contains the print transaction.

Furthermore, in the tampering detection method, the print transaction is generated in response to a print command, and the print command contains an electronic document to be printed and the registration transaction ID of the electronic document. Based on the registration transaction ID, a corresponding registration transaction can be uniquely acquired. The registration transaction is generated by the node that created the electronic document, is reviewed by the other nodes in the distributed data network, and is synchronously recorded on each node in the distributed data network after obtaining its required review result. The registration transaction contains the identification information of the electronic document.

Moreover, in the tampering detection method, the verification code is used to indicate the consistency of the identification information contained in the registration transaction and the electronic document to be printed, and is generated after the print command is received. The verification code is embedded into the electronic document to be printed, and the electronic document containing the verification code is printed as the paper copy.

Additionally, in the tampering detection method, the verification code is generated by the node that printed an electronic document. The generated verification code contains a prefix code for identifying the node that generated the verification code. Determination of the verification code detection result of the optically readable copy further includes steps of determining, based on the prefix code detected in the verification code, the node that generated the verification code; and requesting for a print transaction address (i.e., the print transaction ID) stored in association with the verification code to the node that generated the verification code.

Furthermore, in the tampering detection method, the verification code is generated by the node that printed the electronic document, and is sent to the other nodes in the distributed data network for review by the other nodes. The verification code obtaining its required review result is synchronously recorded on each node in the distributed data network. Determination of the verification code detection result of the optically readable copy further includes a step of acquiring, based on the verification code detected, a print transaction address (i.e., the print transaction ID) stored in association with the verification code.

Moreover, after determining whether the paper copy has been tampered with, the tampering detection method further includes steps of generating a scan transaction containing the print transaction ID of the paper copy, a scan verification result indicating whether the paper copy has been tampered with, and scan operation information; and sending the generated scan transaction to the other nodes in the distributed data network for review by the other nodes. The scan transaction obtaining its required review result is synchronously recorded on each node in the distributed data network, and each node in the distributed data network can uniquely acquire, based on a scan transaction ID, a corresponding scan transaction.

Additionally, in the tampering detection method, the print transaction contains a registration transaction address (e.g., the registration transaction ID) of an electronic document to be printed, corresponding to the paper copy, and the verification code is further stored in association with the scan transaction ID. The tampering detection method further includes steps of determining, based on the print transaction, the registration transaction ID of the electronic document, and determining, based on the verification code, the associated scan transaction ID; based on the registration transaction ID and the scan transaction ID, obtaining the registration transaction and the scan transaction of the electronic document; and displaying or outputting the information contained in the registration transaction, the print transaction, and the scan transaction.

Furthermore, in the tampering detection method, authentication is required for sending, reading, and receiving the data in the distributed data network, and at least one of the plurality of entities is allowed, after being authenticated, to perform sending, reading, and receiving the data in the distributed data network.

According to a second aspect of the present disclosure, a tampering detection apparatus is provided that corresponds to one of a plurality of entities involved in a paper copy transfer process. The tampering detection apparatus serves as a node in a distributed data system, and the respective nodes in the distributed data network correspond to different tampering detection apparatuses. The tampering detection apparatus serving as the node includes a distributed data management device and a scan verification device. The distributed data management device is configured to send/receive data to/from the other nodes in the distributed data network and to receive/send a review result with respect to the data from/to the other nodes. The data obtaining its required review result is synchronously recorded on each node in the distributed data network. The data recorded on each node in the distributed data network is used to check tampering with the data recorded on the other nodes in the distributed data network, and contains a print transaction. The scan verification device is configured to obtain an optically readable copy of a paper copy; to acquire a verification code detection result of the optically readable copy; to determine, if the verification code detection result does not contain a verification code, that the paper copy has been tampered with; and to attain, if the verification code detection result contains a verification code and its associated print transaction ID, a print transaction of a corresponding electronic document based on the print transaction ID, and compare the optically readable copy with the information contained in the print transaction so as to determine whether the paper copy has been tampered with.

Furthermore, in the tampering detection apparatus, the print transaction is generated in response to a print command, and the print command contains an electronic document to be printed and the registration transaction ID of the electronic document. Based on the registration transaction ID, a corresponding registration transaction can be uniquely acquired. The registration transaction is generated by the node that created the electronic document, is reviewed by the other nodes in the distributed data network, and is synchronously recorded on each node in the distributed data network after obtaining its required review result. The registration transaction includes the identification information of the electronic document.

Moreover, in the tampering detection apparatus, the verification code is used to indicate the consistency of the identification information contained in the registration transaction and the electronic document to be printed, and is generated after the print command is received. The verification code is embedded into the electronic document to be printed, and the electronic document containing the verification code is printed as the paper copy.

Additionally, in the tampering detection apparatus, the verification code is generated by the node that printed an electronic document. The generated verification code contains a prefix code for identifying the node that generated the verification code. The scan verification device is further configured to determine the node generating the verification code based on the prefix code detected in the verification code, and to request for a print transaction address (i.e., the print transaction ID) stored in association with the verification code to the node generating the verification code.

Furthermore, in the tampering detection apparatus, the verification code is generated by the node that printed the electronic document, and is sent to the other nodes in the distributed data network for review by the other nodes. The verification code obtaining its required review result is synchronously recorded on each node in the distributed data network. The scan verification device is further configured to acquire, based on the verification code detected, a print transaction address (i.e., the print transaction ID) stored in association with the verification code.

Moreover, in the tampering detection apparatus, the scan verification device is further configured to generate a scan transaction containing the print transaction ID of the paper copy, a scan verification result indicating whether the paper copy has been tampered with, and scan operation information, and to send the generated scan transaction to the other nodes in the distributed data network for review by the other nodes. The scan transaction obtaining its required review result is synchronously recorded on each node in the distributed data network, and each node in the distributed data network can uniquely acquire, based on a scan transaction ID, a scan transaction corresponding to the scan transaction ID.

Additionally, in the tampering detection apparatus, the print transaction contains a registration transaction address (i.e., the registration transaction ID) of an electronic document to be printed, corresponding to the paper copy, and the verification code is further stored in association with the scan transaction ID. The tampering detection apparatus further includes a document tracking device and a display device. The document tracking device is configured to determine, based on the print transaction, the registration transaction ID of the electronic document, to determine, based on the verification code, the associated scan transaction ID, and to obtain, based on the registration transaction ID and the scan transaction ID, the registration transaction and the scan transaction of the electronic document. The display device is configured to display the information contained in the registration transaction, the print transaction, and the scan transaction.

Furthermore, in the tampering detection apparatus, authentication is required for sending, reading, and receiving the data in the distributed data network. The tampering detection apparatus further includes an authentication device configured to performing authentication on the distributed data management apparatus. The distributed data management apparatus is allowed, after being authenticated, to carry out sending, reading, and receiving the data in the distributed data network.

According to a third aspect of the present disclosure, another tampering detection apparatus is provided. The other tampering detection apparatus corresponds to one of a plurality of entities involved in a paper copy transfer process, and includes a storage storing computer-executable instructions and a processor connected to the storage. The computer-executable instructions, when executed, cause the processor to implement steps of obtaining an optically readable copy of a paper copy; acquiring a verification code detection result of the optically readable copy; if the verification code detection result does not contain a verification code, then determining that the paper copy has been tampered with; and if the verification code detection result contains a verification code and its associated print transaction ID, then attaining a corresponding print transaction based on the print transaction ID, and comparing the optically readable copy with the information contained in the print transaction so as to determine whether the paper copy has been tampered with.

The other tampering detection apparatus serves as a node in a distributed data network, and is used to send/receive data to/from other nodes in the distributed data network and to receive/send a review result with respect to the data from/to the other nodes. The data obtaining its required review result is synchronously recorded on each node in the distributed data network. The respective nodes in the distributed data network correspond to different tampering detection apparatuses. The data recorded on each node in the distributed data network is used to check tampering with the data recorded on other nodes in the distributed data network, and contains the print transaction.

According to a fourth aspect of the present disclosure, a non-transitory computer-readable storage medium is provided in which computer-executable instructions are stored. The computer-executable instructions, when executed by a processor, cause the processor to achieve the tampering detection method described above.

By utilizing the tampering detection method and the tampering detection apparatuses, once a creation operation or a print operation is conducted with respect to an electronic document, or a scan operation is performed on the paper copy of the electronic document, the following transactions, i.e., a registration transaction, a print transaction, and a scan transaction may be recorded on the respective nodes in the distributed data network in a manner of distributed storage after the respective nodes reach a consensus. Because the data in the distributed data network cannot be tampered with, and since a consensus has been reached among the respective nodes in the related distributed data network, by using this kind of distributed storage approach, it is possible to solve the problem of trust in a cross-entity paper copy verification process and to find any tampering with a paper copy in a process of cross-entity transfer of the paper copy. In addition, sending, reading, and receiving the data in the distributed data network require authentication, and at least one of the relating entities is allowed to perform sending, reading, and receiving the data in the distributed data network after being authenticated. Accordingly, by adopting such an authentication approach, for different electronic documents, different nodes in the distributed data network may be allowed to send, read, and receive the relevant transaction data. Moreover, by employing such an authentication method, the privacy problem of cross-entity electronic document verification may be solved, and an entity that has authority to send, read, and receive the relevant transaction data may be flexibly controlled. Furthermore, by storing a verification code in association with a print transaction ID and a scan transaction ID, all the electronic document related transaction information may be read from the distributed data network, thereby solving the problem of history tracking in a cross-entity transfer process of an electronic document.

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and repeated explanations for the constructional elements are omitted.

Figure 1:
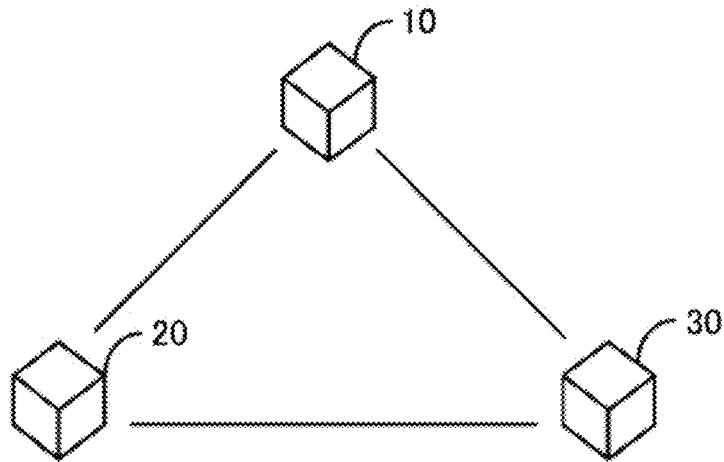
FIG. 1 illustrates an application environment of the embodiments of the present disclosure.

FIG. 1 illustrates an application environment of the embodiments of the present disclosure.

As shown in FIG. 1, a distributed data network is composed of the entities 10, 20, and 30. For example, in a scenario of secure contract management, the entities 10, 20, and 30 may be regarded as the parties involved in a contract, and each of the entities 10, 20, and 30 may serve as a node in the distributed data network. Data communications may be carried out among the respective nodes in the distributed data network by a wired or wireless network. Here it should be noted that the number of entities shown in FIG. 1 is just for illustration. That is, the present disclosure is not limited to this. More nodes may be included in the distributed data network.

First Embodiment

This embodiment relates to a tampering detection method which is described by referring to FIGS. 2 to 4 as follows.

Figure 2:
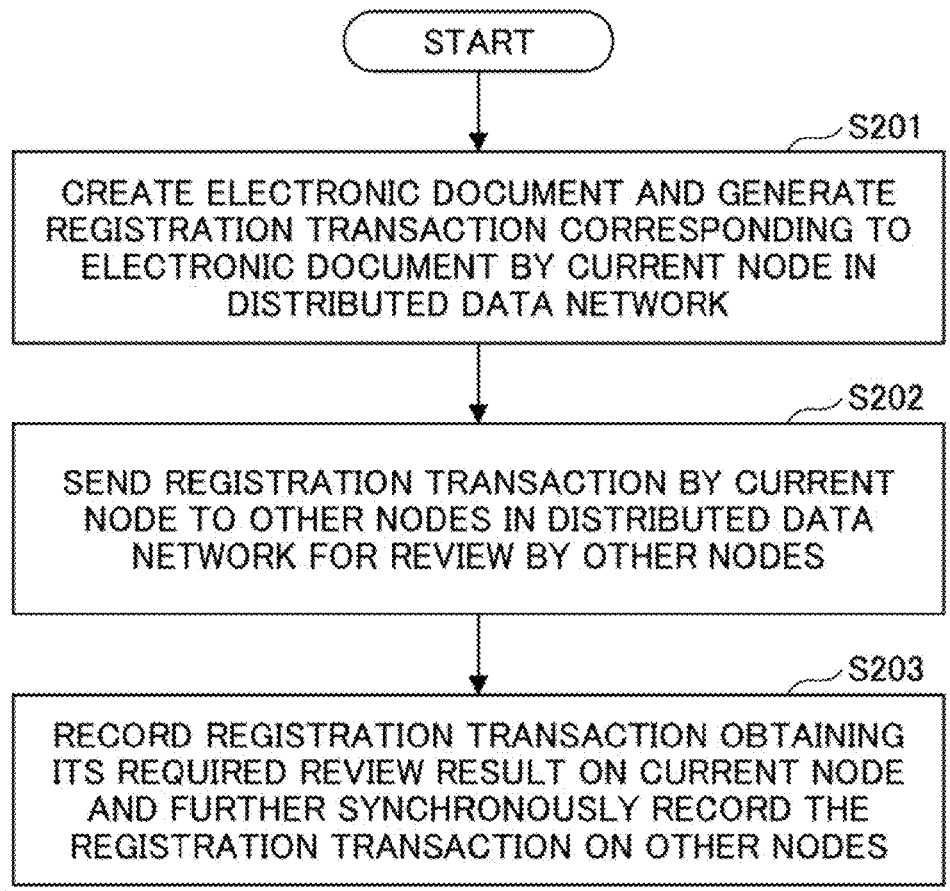
FIG. 2 is a flowchart of the process of an electronic document registration approach in a first embodiment of the present disclosure.

FIG. 2 is a flowchart of the process of an electronic document registration approach in this embodiment.

Any one of the entities 10, 20, and 30 shown in FIG. 1 may execute the electronic document registration approach. As presented in FIG. 2, the electronic document registration approach is inclusive of STEPS S201 to S203.

First, in STEP S201, a node (also called a "current node") creates an electronic document, and generates a registration transaction corresponding to the electronic document. Here, the registration transaction contains the identification information of the electronic document. For example, the identification information of the electronic document may include but is not limited to the identifier (ID), name, size, digital digest (such as a Hash value), involved event, creator information (e.g., a name, ID, and/or email address), or other related information of the electronic document.

Next, in STEP S202, the current node that created the electronic document sends the generated registration transaction to the other nodes in the distributed data network for review (verification) by the other nodes. For example, each of the other nodes may compare the identification information contained in the registration transaction with the electronic document. If the two are consistent, then the review is passed, and a digital signature is added to the registration transaction; otherwise, the review is not passed.

Finally, in STEP S203, the registration transaction that obtained its required review result is recorded in the current node, and is further synchronously recorded on the other nodes in the distributed data network. If a registration transaction obtained its required review result, then it may be regarded that a consensus has been reached among the respective nodes of the distributed data network, and the registration transaction is data that the respective entities can trust mutually. As such, the data (i.e., the registration transaction) that has been reviewed by each entity and has obtained a consensus of the respective nodes in the distributed data network is stored in each entity so as to achieve the distributed storage of the data. For example, the required review result may be approval by all the other nodes or a part (e.g., most nodes) of the other nodes. This may be flexibly selected and set according to the specific design requirements.

Here it should be noted that each node in the distributed data network records complete transaction data, so each node may participate in monitoring tampering with an electronic document or a paper copy. Additionally, each node in the distributed data network is independent and has the same status, and the respective nodes rely on a consensus mechanism to ensure storage consistency. Moreover, the transaction data recorded on each node in the distributed data network is used to verify tampering with the transaction data in the other nodes. That is, when the transaction data recorded on a node in the distributed data network is modified, the other nodes will be able to find the modification. Consequently, the problem of single-point tampering may be effectively avoided. Furthermore, by using the distributed data network, unless all nodes are destroyed, the transaction data will not be lost, thereby ensuring the security of the transaction data. In addition, the transaction data includes not only the registration transaction but also a print transaction and a scan transaction described below.

Also, the registration transaction has a registration transaction ID corresponding to itself. For example, the registration transaction ID may be a logical address. Based on the registration transaction ID, its corresponding registration transaction may be uniquely retrieved in the recorded data.

For example, this kind of decentralized distributed data network may be realized by using blockchain technology. In this case, each node sets up a blockchain ledger locally for storing the transaction data that is related to the operation of an electronic document and has obtained a consensus of the respective nodes in the distributed data network, such as the registration transaction set forth. Moreover, the transaction data in the blockchain ledger cannot be tampered with.

After the electronic document is created, a print process of the electronic document may be involved.

Figure 3:
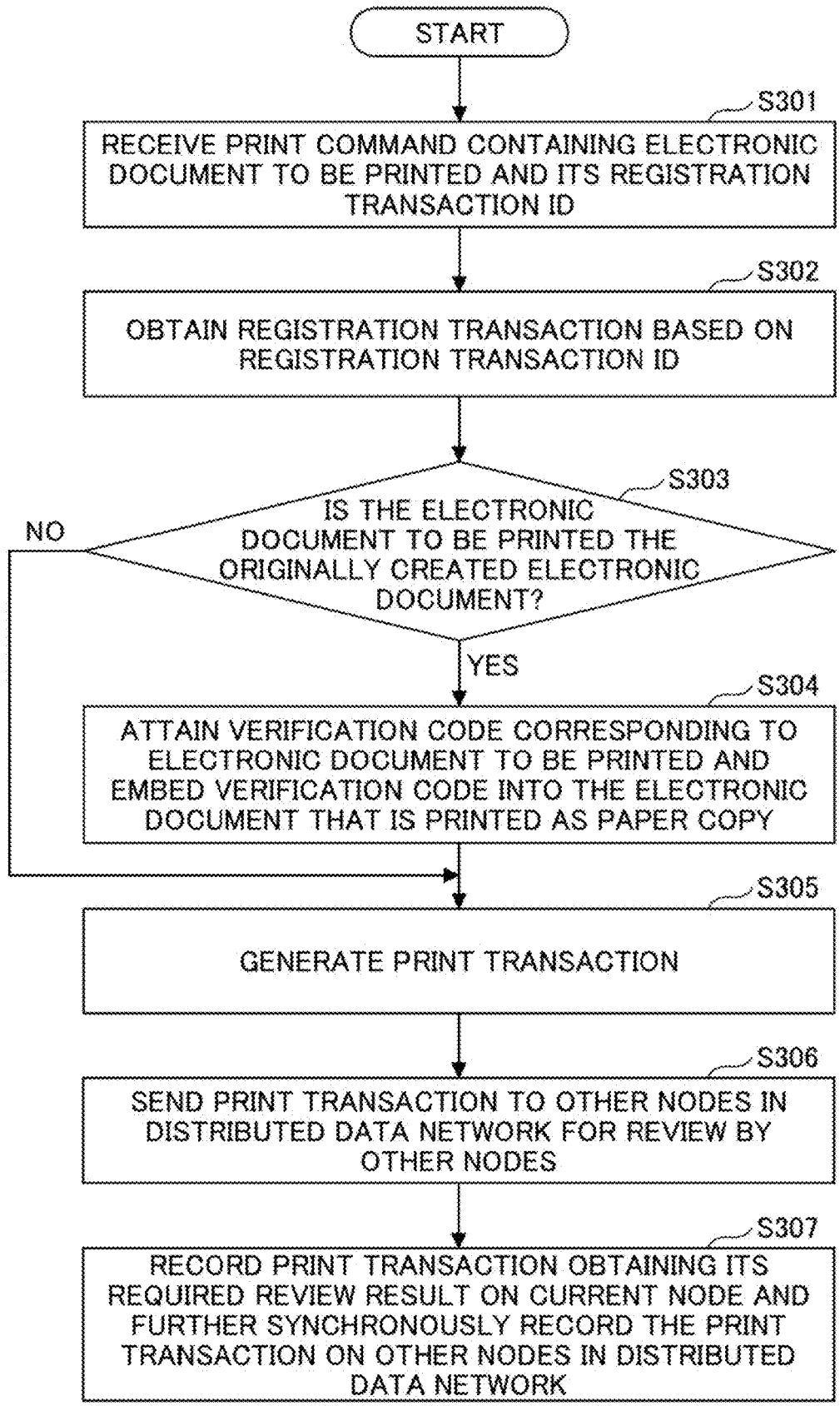
FIG. 3 is a flowchart of the process of a print verification approach in the first embodiment of the present disclosure.

FIG. 3 is a flowchart of the process of a print verification approach in this embodiment.

Similar to the electronic document registration approach, the print verification approach may also be executed by any one of the entities 10, 20, and 30 shown in FIG. 1. Additionally, the entity executing the print verification approach may be the same as the entity executing the electronic document registration approach, or may be different from the entity executing the electronic document registration approach. For example, the registration of the electronic document may be performed in an entity first, and then, the print of the electronic document may be performed. Alternatively, it is possible to conduct the registration of the electronic document in an entity, and then, to perform the print of the electronic document in another entity. As presented in FIG. 3, the print verification approach includes STEPS S301 to S307.

First, in STEP S301, a print command is received that contains an electronic document to be printed and its registration transaction ID. For example, the print command may be generated in response to clicking, by a user, a print icon in the electronic document to be printed.

Then, in STEP S302, a registration transaction is retrieved on the basis of the registration transaction ID.

Next, in STEP S303, the identification information included in the registration transaction is compared with the electronic document to be printed so as to determine whether the electronic document to be printed is the originally created electronic document. For example, as described above, the identification information may be inclusive of a digital digest such as a Hash value. The Hash value of the electronic document to be printed is calculated, and is compared with the Hash value contained in the identification information. If the two are different, then the electronic document to be printed is considered to be different from the originally created electronic document. If the two are the same, other information included in the identification information may be used for further comparison.

If all the information included in the identification information is consistent with the electronic document to be printed, then YES is determined in STEP S303. At this time, the print of the electronic document to be printed is allowed, and the process proceeds to STEP S304. In STEP S304, a verification code corresponding to the electronic document to be printed is obtained, and is embedded in the electronic document that may be printed as a paper copy. Then, the process enters step S305.

The verification code may be a machine-readable code, and may be an unreadable code for human eyesight. Moreover, the verification code may be a one-dimensional or two-dimensional code, and may be printed on a common paper medium by the black and white toner, color toner, or fluorescent material of a common printer. Then, an optically readable copy may be obtained by scanning the paper copy using a scanner or taking a picture of the paper copy using a camera, and the verification code may be extracted by processing the optically readable copy using a specific algorithm. For example, this may be realized by invisible watermarking technology.

Here, for example, the verification code may be a verification code corresponding to the electronic document; that is, the verification code is the same for each page contained in the electronic document. Of course, for different electronic documents, the corresponding verification codes are different. In this case, a verification code may uniquely identify an electronic document, and may be used to distinguish the paper copies of different electronic documents, but cannot be used to distinguish multiple paper copies of the same electronic document.

Alternatively, for another example, the verification code may include multiple verification codes associated with all the paper copies of the electronic document. That is, for different paper copies printed from the same electronic document, the corresponding verification codes are different. In this case, such a verification code may not only uniquely identify an electronic document but also distinguish the different paper copies of the same electronic document.

Alternatively, in an example, the verification code may include multiple verification codes respectively associated with all the paper of each paper copy of the electronic document. That is, for different paper copies printed from the same electronic document, the corresponding verification codes are different. Additionally, for different pages in the same paper copy, the corresponding verification codes are also different. In this case, such a verification code may not only uniquely identify the different paper copies of an electronic document but also distinguish the different pages in each paper copy.

Of course, the identification granularity of the verification code may be flexibly selected and set according to the specific application scenarios and design requirements, and the present disclosure is not limited to the above examples.

Furthermore, in an example, the verification code corresponding to the electronic document to be printed may also be fetched from a remote server.

Specifically, the remote server may be a centralized server connected to each entity. When the verification with respect to the electronic document to be printed is successful in an entity, the entity may request the server to generate a verification code. For example, the server may randomly generate a verification code, and may send the generated verification code to the entity that made the request.

Alternatively, in another example, the verification code corresponding to the electronic document to be printed may be generated locally. The specific generation approach is similar to that of the server. In this case, as a first example, a verification code is saved only at the entity that generated the verification code. Specifically, the generated verification code includes a prefix code for identifying the entity that generated the verification code. As a second example, a verification code is not saved only in the entity that generated the verification code. The verification code may be stored in a manner similar to the distributed storage of the registration transaction described above. Particularly, after the verification code is generated locally (i.e., by the current entity), the generated verification code is sent to the other entities (nodes) in the distributed data network for review (verification) by the other nodes. Here, the verification code that obtained its required review result is stored in the current node, and is further synchronously recorded on the other nodes in the distributed data network.

On the other hand, if any piece of information included in the identification information is inconsistent with the electronic document to be printed, then NO is determined in STEP S303. At this time, the print of the electronic document to be printed is prohibited, and the process enters STEP S305.

In STEP S305, a print transaction is generated. For example, the print transaction includes the registration transaction ID of the electronic document to be printed and a print verification result indicating whether the electronic document to be printed is the original electronic document. When the print verification result indicates that the electronic document to be printed is the originally created electronic document, the print transaction may further include paper copy identification information.

Here, the purpose of containing the registration transaction ID in the print transaction is to be able to track the relevant information of the originally created electronic document. Especially when the print of the paper copy is not completed, the user may track the history of the print verification failure of the corresponding electronic document based on the registration transaction ID contained in the print transaction, so as to grasp the situation of attempts to tamper with the electronic document and print it. In this case, because the verification code is not generated, for example, a print transaction ID may be stored in association with the registration transaction ID.

As another example, when the print of the paper copy is not completed, the print transaction may include the registration transaction ID of the electronic document to be printed and a print verification result indicating tampering; however, when the print of the paper copy is completed, the print transaction may only include paper copy identification information.

For example, the paper copy identification information may include but is not limited to the print time of the paper copy, the relevant printer information (e.g., a device ID, model, and/or IP address), the related operator information (e.g., a name, ID, and/or email address), the number of copies printed at the same time, the number of pages of each copy, the relevant entity information (e.g., an entity name and/or ID), the related verification code information, etc.

Then, in STEP S306, the generated print transaction is sent to the other nodes in the distributed data network for review by the other nodes.

Finally, in STEP S307, the print transaction that obtained its required review result is recorded in the current node, and is further synchronously recorded in the other nodes of the distributed data network. If a print transaction obtained its required review result, then it may be regarded that a consensus has been reached among the respective nodes in the distributed data network, and the print transaction is data that the respective entities can trust mutually. As such, the data (i.e., the print transaction) that has been reviewed by each entity and has obtained a consensus of the respective nodes in the distributed data network is stored in each entity (node) so as to achieve the distributed storage of the data. For example, the required review result may be approval by all the other nodes or a part (e.g., most nodes) of the other nodes. This may be flexibly selected and set according to the specific design requirements. Thus, it can be seen that the distributed storage of the print transaction is exactly the same as the distributed storage of the registration transaction.

In addition, the print transaction has a corresponding print transaction ID. For example, the print transaction ID may be a logical address. Based on the print transaction ID, its corresponding print transaction may be uniquely retrieved from the recorded data.

Moreover, in order to facilitate the retrieval of the related print transaction in the subsequent paper copy scan process, the verification code needs to be stored in association with the print transaction ID. For example, in a case where the verification code is fetched from a remote server, after the print transaction is generated, the print transaction ID is further sent to the server, and is stored on the server in association with the previously generated verification code. In a case where the verification code is locally generated and only stored locally, the print transaction ID is associated with the verification code, and the two are stored locally. Additionally, in a case where the verification code is generated locally and stored in a distributed manner, the print transaction ID and the verification code are associated, and the two are stored on each node in the distributed data network.

After the electronic document is created and printed as described above, a scan verification process with respect to the printed paper copy may be involved.

Figure 4:
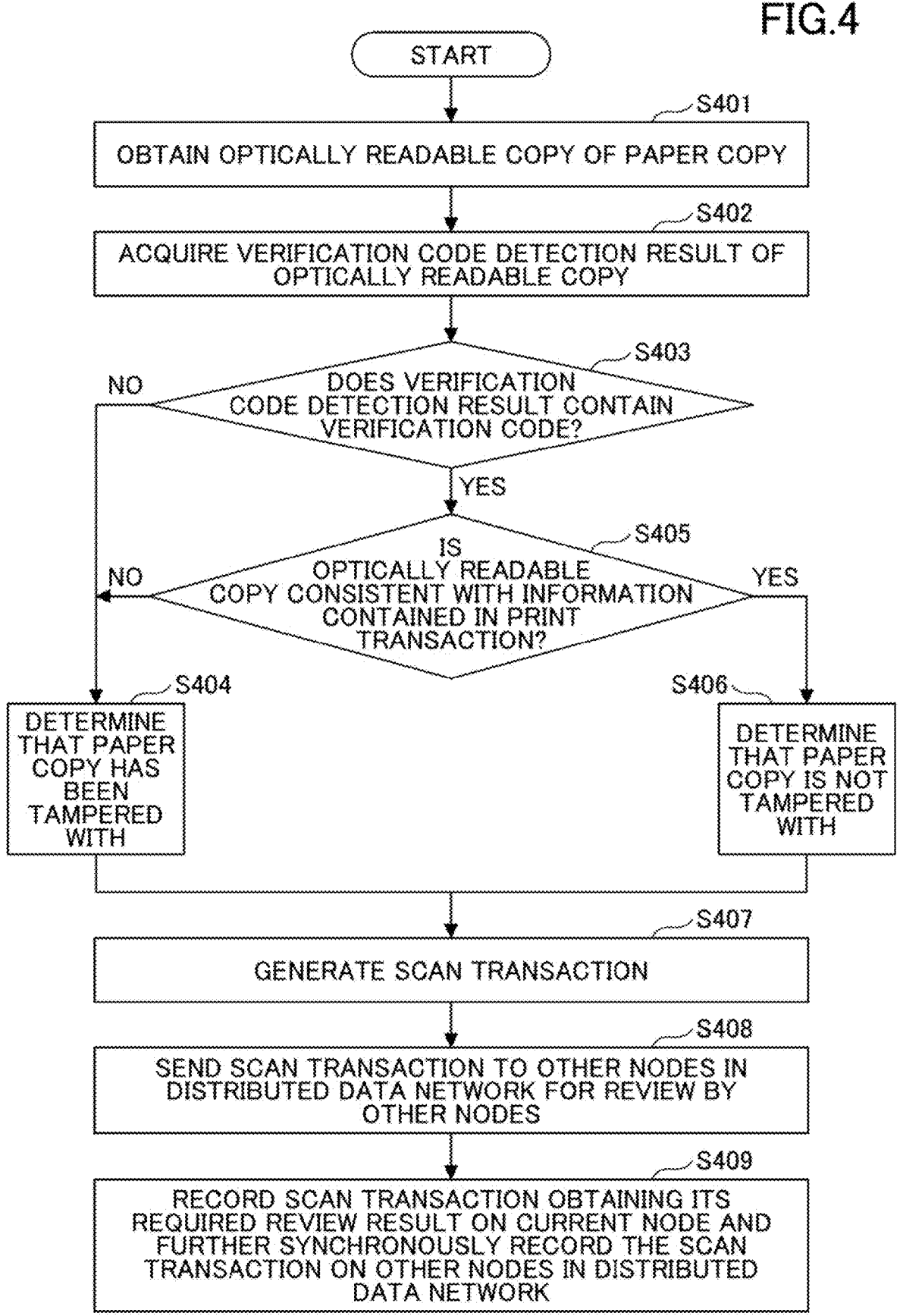
FIG. 4 is a flowchart of the process of a scan verification approach in the first embodiment of the present disclosure.

FIG. 4 is a flowchart of the process of a scan verification approach in this embodiment.

Analogous to the electronic document registration approach and the print verification approach, the scan verification approach may also be conducted by any one of the entities 10, 20, and 30 shown in FIG. 1. In addition, the entity conducting the scan verification approach may be the same as or different from the entity conducting the electronic document registration approach and the entity executing the print verification approach. For example, the registration of the electronic document, the print of the electronic document, and the scan verification of the paper copy may be performed in the same entity. Alternatively, it is possible to perform the registration of the electronic document in a first entity, the print of the electronic document in a second entity, and the scan verification of the paper copy in a third entity. Alternatively, the registration and print of the electronic document may be conducted by an entity, and the scan verification of the paper copy may be conducted by another entity. Of course, any other combinations are also applicable, and are included in the technical scope of the present disclosure. As presented in FIG. 4, the scan verification approach contains STEPS S401 to S409.

First, in STEP S401, an optically readable copy of the paper copy is obtained. For example, the optically readable copy may be obtained by scanning the paper copy using a scanner or taking a picture of the paper copy using a camera.

Then, in STEP S402, a verification code detection result of the optically readable copy is acquired. The verification code detection result may include whether a verification code is detected. When the verification code is detected, the verification code detection result further includes the print transaction ID associated with the verification code.

For example, in the case where the verification code is generated by the remote server, correspondingly, the optically readable copy may be sent to the remote server, and the remote server may perform the extraction of the verification code so as to generate the verification code detection result.

Alternatively, in the case where the verification code is stored only at the node that generated the verification code, verification code extraction is performed locally. If the verification code is detected, then based on the prefix code in the verification code, the node (entity) that generated the verification code is determined. And then, a request for the print transaction ID associated with the verification code is sent to the node that generated the verification code.

Alternatively, in the case where the verification code is stored in a distributed manner, the verification code is extracted locally. If the verification code is detected, it is possible to locally acquire the associated print transaction ID on the basis of the verification code.

In STEP S403, it is determined whether the verification code detection result contains a verification code. If the determination result in STEP S403 is NO, i.e., the verification code detection result has no verification code, the process proceeds to STEP S404. In STEP S404, it is determined that the paper copy has been tampered with. As set forth, only an electronic document passing the print verification can be printed as a paper copy, and a verification code is embedded in the electronic document before it is printed as a paper copy. Accordingly, a printed paper copy after verification must include a verification code. In other words, if a verification code is not detected in the printed paper copy, the printed paper copy must be a tampered copy.

On the other hand, if the determination result in STEP S403 is YES, i.e., the verification code detection result contains a verification code and its associated print transaction ID, the process enters STEP S405. In STEP S405, the corresponding print transaction is obtained based on the print transaction ID, and the information contained in the print transaction is compared with the corresponding information of the optically readable copy so as to determine whether the two are consistent, thereby determining whether the paper copy has been tampered with. If the determination result in STEP S405 is YES, the process proceeds to STEP S406. In STEP S406, it is determined that the paper copy has not been tampered with. On the other hand, if NO is determined in STEP S405, the process enters STEP S404. In STEP S404, it is determined that the paper copy has been tampered with.

As described above, the print transaction is inclusive of paper copy identification information, and the paper copy identification information includes but is not limited to the print time of the paper copy, the related printer information (e.g., a device ID, model, and/or IP address), the relevant operator information (e.g., a name, ID, and/or email address), the number of copies printed at the same time, the number of pages of each copy, the related entity information (e.g., an entity name and/or ID), the relevant verification code information, etc. Because a paper copy may contain multiple pages, the related optically readable copy also includes multiple pages in this case. For example, if an optically readable copy has 9 pages in total and contains verification code information in each page, but the number of pages of the corresponding copy in the relevant paper copy identification information is 10, i.e., the information contained in the related print transaction does not match the corresponding information of the optically readable copy, that means the paper copy is missing a page, i.e., the paper copy has been tampered with. Alternatively, as set forth, if the verification code can identify each page in the paper copy, then it may be further determined which page is missing in the paper copy based on the detected verification code. For another example, if an optically readable copy has 10 pages and contains verification code information in 9 pages (i.e., one page does not contain verification code information), and the number of pages of the corresponding copy in the related paper copy identification information is 10, i.e., the information contained in the relevant print transaction is inconsistent with the corresponding information of the optically readable copy, that means one page of the paper copy has been replaced, i.e., the paper copy has been tampered with. Alternatively, as depicted above, if the verification code can identify each page in the paper copy, then it may be further determined which page is replaced in the paper copy based on the detected verification code.

Moreover, as described above, the print transaction is generated in response to the print command, and the print command includes the electronic document to be printed and its registration transaction ID. Additionally, the corresponding registration transaction may be uniquely obtained based on the registration transaction ID. The registration transaction is generated by the node that created the electronic document, and is reviewed by the other nodes in the distributed data network. The registration transaction is synchronously recorded in each node of the distributed data network after obtaining its required review result, and includes the identification information of the electronic document.

Furthermore, the verification code is used to indicate the consistency between the identification information included in the registration transaction and the electronic document to be printed, and is generated after receiving the print command. The verification code is embedded in the electronic document to be printed that is printed as the paper copy.

After STEP S404 or STEP S406, the process enters step S407. In STEP S407, a scan transaction is generated. Here, for example, the scan transaction may include the print transaction ID of the paper copy, a scan verification result indicating whether the paper copy has been tampered with, and scan operation information. The scan operation information may include but is not limited to the time of the relevant scan operation, the related scanner identification information (e.g., a scanner ID, model, IP address, etc.), the relevant operator identification information (e.g., a name, ID, email address, etc.), the number of scanned copies, the number of scanned pages, the identification information of the entity where the scan operation is located (such as the name of an institution), etc. For example, when the scan verification result indicates that the paper copy has been tampered with, the scan verification result may further include an instruction about the tampering information, containing which page is missing, which page is replaced, which page is added, and so on.

Similar to the registration transaction and the print transaction described above, next, in STEP S408, the generated scan transaction is sent to the other nodes in the distributed data network for review by the other nodes.

Finally, in STEP S409, the scan transaction that obtained its required review result is recorded in the current node, and is further synchronously recorded in the other nodes of the distributed data network. If a scan transaction obtained its required review result, then it may be considered that a consensus has been reached among the respective nodes in the distributed data network, and the scan transaction is data that the respective entities can trust mutually. As such, the data (i.e., the scan transaction) that has been reviewed by each entity and has obtained a consensus of the respective nodes in the distributed data network is stored in each entity so as to achieve the distributed storage of the data. For example, the required review result may be approval by all the other nodes or a part (e.g., most nodes) of the other nodes. This may be flexibly selected and set according to the specific design requirements. Hence, it can be seen that the distributed storage of the scan transaction is exactly the same as the distributed storage of the registration transaction and the distributed storage of the print transaction set forth.

In addition, as with the print transaction described above, the scan transaction has a scan transaction ID corresponding to itself. For example, the scan transaction ID may be a logical address. Based on the scan transaction ID, the scan transaction corresponding to this ID may be uniquely retrieved from the recorded data.

Moreover, in order to facilitate the retrieval of the relevant scan transaction in the subsequent paper copy scan process, the verification code may be stored in association with the scan transaction ID. For example, in a case where the verification code is obtained from a remote server, after the scan transaction is generated, the scan transaction ID is further sent to the server, and is stored in the server in association with the previously generated verification code. In a case where the verification code is generated locally by an entity, and is only stored locally in the entity, the scan transaction ID is associated with the verification code, and the two are stored in the entity that generated the verification code. Additionally, in a case where the verification code is generated locally by an entity, and is stored in a distributed manner, the scan transaction ID is associated with the verification code, and the two are stored in each node of the distributed data network.

A paper copy is produced after a print operation, so there exists a corresponding print transaction. Additionally, in a process of transferring a paper copy among multiple entities (e.g., institutions), multiple times of scan verification may be performed, and multiple scan transactions may be generated. In a cross-entity transfer process of a paper copy, if the entity that received the paper copy wants to track the history of the paper copy, then it is possible to perform scan verification on the paper copy for detecting a verification code, and to acquire both the print transaction ID and the scan transaction ID associated with the verification code by the above-mentioned remote server, the entity that generated the verification code, or the entity that scanned the verification code, for example.

As described above, the print transaction includes the registration transaction address (i.e., the registration transaction ID) of the electronic document to be printed, and the verification code is further stored in association with the scan transaction ID. In this case, when an entity receives a paper copy, the entity may perform optical scan on the paper copy so as to obtain a verification code therein. Based on the verification code, its associated registration transaction ID, print transaction ID, and scan transaction ID may be determined. Moreover, based on the registration transaction ID, the print transaction ID, and the scan transaction ID, the corresponding registration transaction, the corresponding print transaction, and the corresponding scan transaction may be obtained, respectively, and the information contained in these transactions may be output on a display for check by a user or output to an external device.

Specifically, based on the verification code, its associated print transaction ID and print transaction may be determined. Then, based on the print transaction, the registration transaction ID of the corresponding electronic document may be determined. Additionally, based on the verification code, its associated scan transaction ID may also be determined. Next, based on the registration transaction ID and the scan transaction ID, the registration transaction and the scan transaction of the electronic document corresponding to the paper copy may be obtained. Finally, the information contained in the registration transaction, the print transaction, and the scanning transaction may be displayed or output.

Moreover, as set forth, the transaction data such as the registration transaction data, the print transaction data, and the scan transaction data is managed and stored in the distributed data network. For example, this kind of transaction data may be data stored in the format and structure of blockchain technology. However, the tampering detection method may further include storing the transaction data such as the registration transaction data, the printing transaction data, and the scan transaction data in a format and structure different from the format and structure of the blockchain technology, so that a user may check the transaction data more easily.

In the foregoing, by referring to FIGS. 2 to 4, the electronic document registration approach involved when creating an electronic document, the print verification approach involved when printing the created electronic document, and the scan verification approach involved when receiving a paper copy are described in a chronological order, respectively. Once an electronic document is created or printed, or a paper copy is scanned, a corresponding transaction, i.e., a registration transaction, a print transaction, or a scan transaction may be recorded in each node of the distributed data network in a manner of distributed storage after a consensus is reached among the respective nodes in the distributed data network. The data in the distributed data network cannot be tampered with, and has obtained a consensus of the respective nodes in the distributed data network. By utilizing such a distributed storage manner, the trust problem in a cross-entity paper copy verification process can be solved, and any tampering with a paper copy can be found in a cross-entity transfer process of the paper copy.

Furthermore, in an example, sending, reading, and receiving data in the distributed data network need to be authenticated, and at least one of the multiple entities (nodes) is allowed to conduct sending, reading, and receiving the data after being authenticated. For example, the authentication may adopt an account password based approach. All the above-described entities that send, read, and receive the registration transactions, the print transactions, and the scan transactions are nodes that have completed authentication.

By using this type of authentication approach, for different electronic documents, different nodes in the distributed data network may be allowed to send, read, and receive the related transaction data. Specifically speaking, first, only the authenticated nodes are allowed to send the relevant transactions to the distributed data network; second, it is possible to further control only the authenticated nodes to be able to read and receive the transaction data of the related electronic document. For example, it is supposed that the distributed data network includes a first node to a fifth node, i.e., five nodes in total. For an electronic document and its corresponding paper copy, the first node, the second node, and the third node in the distributed data network may be allowed to read and receive the related data by authentication. For another electronic document and its corresponding paper copy, the second node, the third node, and the fifth node in the distributed data network may be allowed to read and receive the related data by authentication.

Moreover, by utilizing this kind of authentication approach, the privacy problem of cross-entity electronic document verification may be solved, and the entities that have authority to send, read, and receive the related transaction data may be flexibly controlled.

In addition, as set forth, by storing a verification code in association with a print transaction ID and a scan transaction ID, all the electronic document related transaction information can be read from the distributed data network, thereby solving the problem of history tracking of an electronic document in a cross-entity transfer process.

Second Embodiment

A tampering detection apparatus is provided in this embodiment that is capable of carrying out the tampering detection method according to the first embodiment.

Figure 5:
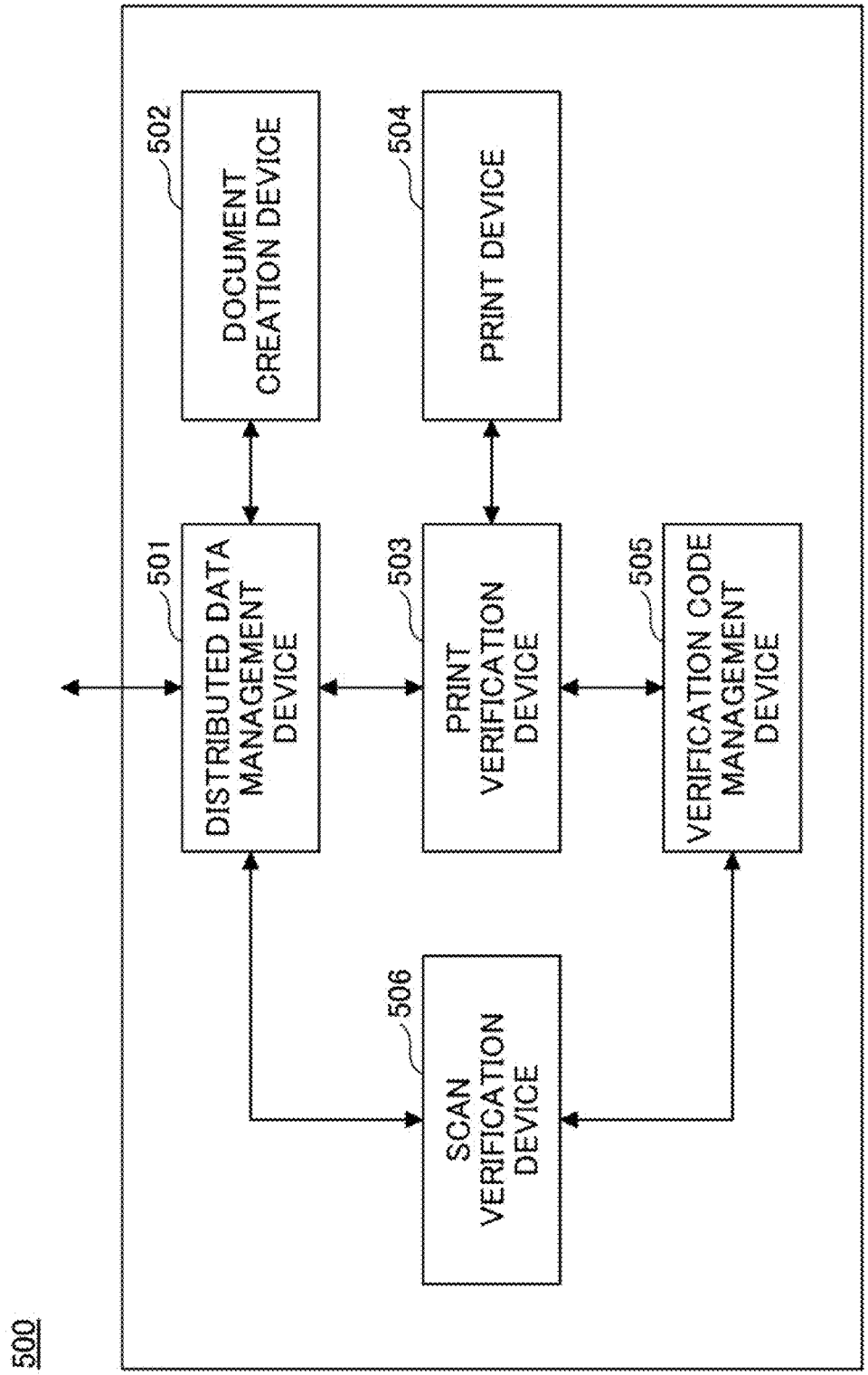
FIG. 5 is a functional block diagram illustrating the configuration of a tampering detection apparatus according to a second embodiment of the present disclosure.

FIG. 5 is a functional block diagram illustrating the configuration of a tampering detection apparatus 500 in accordance with this embodiment.

As presented in FIG. 5, the tampering detection apparatus 500 is inclusive of a distributed data management device 501 and a document creation device 502. For example, the tampering detection apparatus 500 may correspond to any one of the entities 10, 20, and 30 shown in FIG. 1.

The document creation device 502 is configured to create an electronic document and generate a registration transaction corresponding to the electronic document. Here, the registration transaction contains the identification information of the electronic document. For example, the identification information of the electronic document may include but is not limited to the identifier (ID), name, size, digital digest (such as a Hash value), involved event, creator information (e.g., a name, ID, and/or email address), or other related information of the electronic document.

Next, the document creation device 502 sends the generated registration transaction to the distributed data management device 501. The distributed data management device 501 transmits the generated registration transaction to the other nodes in the distributed data network for review (verification) by the other nodes. For example, each of the other nodes may compare the identification information contained in the registration transaction with the electronic document. If the two are consistent, then the review is passed, and a digital signature is added to the registration transaction; otherwise, the review is not passed.

The registration transaction that obtained its required review result is recorded in the distributed data management 501, and the registration transaction is further synchronously recorded on the other nodes in the distributed data network. If a registration transaction obtained its required review result, then it may be regarded that a consensus has been reached among the respective nodes of the distributed data network, and the registration transaction is data that the respective entities can trust mutually. As a result, the data (i.e., the registration transaction) that has been verified by each entity and has obtained a consensus of the respective nodes in the distributed data network is stored in each entity (node) so as to achieve the distributed storage of the data. For example, the required review result may be approval by all the other nodes or a part (e.g., most nodes) of the other nodes. This may be flexibly selected and set according to the specific design requirements.

Thus, it can be seen that in the tampering detection device 500, only the distributed data management device 501 is substantially involved in reading, receiving, and storing data in the distributed data network. That is, although the tampering detection device 500 corresponds to a node in the distributed data network, essentially, the distributed data management device 501 in the tampering detection device 500 corresponds to the node in the distributed data network.

Here, it should be noted that each node in the distributed data network records complete transaction data, so each node may participate in monitoring tampering with an electronic document or a paper copy. Additionally, each node in the distributed data network is independent and has the same status, and the respective nodes rely on a consensus mechanism to ensure storage consistency. Moreover, the transaction data recorded on each node in the distributed data network is used to verify tampering with the transaction data in the other nodes. That is, when the transaction data on a node in the distributed data network is modified, the other nodes will be able to find the modification. Consequently, the problem of single-point tampering may be effectively avoided. Furthermore, by using the distributed data network, unless all nodes are destroyed, the transaction data will not be lost, thereby ensuring the security of the transaction data. In addition, the transaction data includes not only the registration transaction but also a print transaction and a scan transaction described below.

Also, the registration transaction has a registration transaction ID corresponding to itself. For example, the registration transaction ID may be a logical address. Based on the registration transaction ID, its corresponding registration transaction may be uniquely retrieved in the recorded data.

For example, this kind of decentralized distributed data network may be realized by utilizing blockchain technology. In this case, each distributed data management device sets up a blockchain ledger locally for storing the transaction data that is related to the operation of an electronic document and has reached a consensus among the respective nodes in the distributed data network, such as the registration transaction set forth. Moreover, the transaction data in the blockchain ledger cannot be tampered with.

After the electronic document is created by the document creation device 502, a print process of the electronic document may be involved. Accordingly, the tampering detection apparatus 500 may further include a print verification device 503 and a print device 504. Although in FIG. 5, the document creation device 502 and the print verification device 503 are shown in the same tampering detection apparatus 500, as described above, an electronic document to be printed by the print device 504 is not necessarily created by the document creation device 502 in the same tampering detection apparatus 500; that is, an electronic document to be printed may be created by a document creation device in another tampering detection apparatus.

The print verification device 503 may be configured to carry out the following processes. First, a print command is received that contains an electronic document to be printed and its registration transaction ID. For example, the print command may be generated in response to clicking, by a user, a print icon in the electronic document to be printed. Then, a registration transaction is retrieved on the basis of the registration transaction ID. Next, the identification information included in the registration transaction is compared with the corresponding information of the electronic document to be printed, so as to determine whether the electronic document to be printed is the originally created electronic document. For example, as described above, the identification information may be inclusive of a digital digest such as a Hash value. The Hash value of the electronic document to be printed is calculated, and compared with the Hash value contained in the identification information. If the two are different, then the electronic document to be printed is considered to be different from the originally created electronic document. If the two are the same, other information included in the identification information may be used for further comparison.

If all the information included in the identification information is consistent with the electronic document to be printed, then the print verification device 503 determines that the electronic document to be printed is the originally created electronic document. At this time, the print of the electronic document to be printed is allowed. In this case, a verification code corresponding to the electronic document to be printed may be generated by a verification code management device 505 in the tampering detection apparatus 500, for example, and may be sent to the print verification device 503. The print verification device 503 may embed the verification code in the electronic document, and may transmit the electronic document with the verification code to the print device 504 for being printed as a paper copy.

The verification code may be a machine-readable code, and may be an unreadable code for human eyesight. Furthermore, the verification code may be a one-dimensional or two-dimensional code, and may be printed on a common paper medium by the black and white toner, color toner, or fluorescent material of a common printer. An optically readable copy may be obtained by scanning the paper copy using a scanner or taking a picture of the paper copy using a camera, and the verification code may be extracted by processing the optically readable copy using a specific algorithm. For example, this may be achieved by invisible watermarking technology.

Here, for example, the verification code may be a verification code corresponding to the electronic document; that is, the verification code is the same for each page contained in the electronic document. Of course, for different electronic documents, the corresponding verification codes are different. In this case, a verification code may uniquely identify an electronic document, and may be used to distinguish the paper copies of different electronic documents, but cannot be used to distinguish multiple paper copies of the same electronic document.

Alternatively, for another example, the verification code may include multiple verification codes associated with all the paper copies of the electronic document. That is, for different paper copies printed from the same electronic document, the corresponding verification codes are different. In this case, this type of verification code may not only uniquely identify an electronic document but also distinguish the different paper copies of the same electronic document.

Alternatively, in an example, the verification code may include multiple verification codes respectively associated with all the paper copies of each paper copy of the electronic document. That is, for different paper copies printed from the same electronic document, the corresponding verification codes are different. Additionally, for different pages in the same paper copy, the corresponding verification codes are also different. In this case, this type of verification code may not only uniquely identify the different paper copies of an electronic document but also distinguish the different pages in each paper copy.

Of course, the identification granularity of the verification code may be flexibly selected and set according to the specific application scenarios and design requirements, and the present disclosure is not limited to the above examples.

Furthermore, in an example, the verification code management device 505 may not be located in the tampering detection apparatus 500, but may be connected to the tampering detection apparatus 500 as a remote server. Of course, in this case, the remote server may further be connected to the other tampering detection apparatuses, and each tampering detection apparatus may request the remote server to assign a verification code when needed.

Specifically, the remote server may be a centralized server connected to each entity (different tampering detection apparatuses). When the verification with respect to the electronic document to be printed is successful in an entity, the entity may request the server to generate a verification code. For example, the server may randomly generate a verification code, and may send the generated verification code to the entity that made the request.

Alternatively, in another example, the verification code management device 505 may be located in the tampering detection apparatus 500 so as to locally generate the verification code corresponding to the electronic document to be printed. For example, in FIG. 5, a case where the verification code management device 505 is contained in the tampering detection apparatus 500 is illustrated. The specific generation approach is similar to that of the server.

In this case, as a first example, a verification code is saved only at the entity that generated the verification code; that is, the verification code is saved only in the tampering detection apparatus 500. Specifically, the generated verification code includes a prefix code for identifying the entity that generated the verification code.

As a second example, a verification code is not saved only in the entity that generated the verification code. The verification code may be stored in a manner similar to the distributed storage of the registration transaction described above. Specifically, after the verification code is generated by the verification code management device 505 (i.e., the current entity (node)), the generated verification code is sent to the distributed data management device 501. Then, the distributed data management device 501 transmits the verification code to the other entities (nodes) in the distributed data network for review (verification) by the other nodes. Here, the verification code that obtained its required review result is stored in the distributed data management device 501, and is further synchronously recorded on the other nodes in the distributed data network.

On the other hand, if any piece of information included in the identification information is inconsistent with the corresponding information of the electronic document to be printed, then the print verification device 503 determines that the electronic document is not the originally created electronic document, but is a tampered electronic document. At this time, the print of the electronic document to be printed is prohibited.

Moreover, the print verification device 503 may further be configured to generate a print transaction. For example, the print transaction may include the registration transaction ID of the electronic document to be printed and a print verification result indicating whether the electronic document to be printed is the originally created electronic document. When the print verification result indicates that the electronic document to be printed is the originally created electronic document, the print transaction may further include paper copy identification information.

Here, the purpose of including the registration transaction ID in the print transaction is to be able to track the relevant information of the originally created electronic document. Especially when the print of the paper copy is not completed, the user may track the history of the print verification failure of the corresponding electronic document based on the registration transaction ID contained in the print transaction, so as to grasp the situation of attempts to tamper with the electronic document and print it. In this case, because the verification code is not generated, for example, a print transaction ID may be stored in association with the registration transaction ID.

As another example, when the print of the paper copy is not completed, the print transaction may include the registration transaction ID of the electronic document to be printed and a print verification result indicating tampering; however, when the print of the paper copy is completed, the print transaction may only include paper copy identification information.

For example, the paper copy identification information may include but is not limited to the print time of the paper copy, the relevant printer information (e.g., a device ID, model, and/or IP address), the related operator information (e.g., a name, ID, and/or email address), the number of copies printed at the same time, the number of pages of each copy, the relevant entity information (e.g., an entity name and/or ID), the related verification code information, etc.

The print verification device 503 sends the generated print transaction to the distributed data management device 501. The distributed data management device 501 transmits the print transaction to the other nodes in the distributed data network for review by the other nodes. Moreover, the print transaction that obtained its required review result is recorded on the distributed data management 501 in the current node, and is further synchronously recorded in the other nodes of the distributed data network. If a print transaction obtained its required review result, then it may be regarded that a consensus has been reached among the respective nodes in the distributed data network, and the print transaction is data that the respective entities can trust mutually. As such, the data (i.e., the print transaction) that has been reviewed by each entity and has obtained a consensus of the respective nodes is stored in each entity so as to achieve the distributed storage of the data. For example, the required review result may be approval by all the other nodes or a part (e.g., most nodes) of the other nodes. This may be flexibly selected and set according to the specific design requirements. Hence, it can be seen that the distributed storage of the print transaction is exactly the same as the distributed storage of the registration transaction.

Moreover, in order to facilitate the retrieval of the related print transaction in the subsequent paper copy scan process, the verification code needs to be stored in association with the print transaction ID. For example, in a case where the verification code management device 505 is achieved by a remote server, after the print transaction is generated, the print transaction ID is further sent to the server, and is stored on the server in association with the previously generated verification code. In a case where the verification code management device 505 is locally contained in the tampering detection apparatus 500, the print transaction ID is associated with the verification code, and the two are locally stored in the verification code management 505. Additionally, in a case where the verification code is generated locally and stored in a distributed manner, the print transaction ID and the verification code are associated, and are stored on the verification code management device in each node of the distributed data network.

After the electronic document is created and printed as described above, a scan verification process with respect to the printed paper copy may be involved. Consequently, the tampering detection apparatus 500 is further inclusive of a scan verification device 506. Although in FIG. 5, the document creation device 502, the print verification device 503, the print device 504, and the scan verification device 506 are shown in the same tampering detection apparatus 500, as set forth, a paper copy to be verified by the scan verification device 506 is not necessarily printed from an electronic document created by the document creation device 502 included in the same tampering detection apparatus 500, or is not necessarily verified and printed by the print verification device 503 and the print device 504 contained in the same tampering detection apparatus 500. For example, the paper copy to be verified may be created by the document creation device in a tampering detection apparatus, and may be verified and printed by the print verification device and print device in another tampering detection apparatus.

The scan verification device 506 is used to acquire an optically readable copy of a paper copy and a verification code detection result of the optically readable copy. If the verification code detection result has no verification code, then it is determined that the paper copy has been tampered with. When the verification code detection result includes a verification code and its associated print transaction ID, the corresponding print transaction is obtained based on the print transaction ID, and the information contained in the print transaction is compared with the corresponding information of the optically readable copy so as to determine whether the paper copy has been tampered with.

For example, in the case where the verification code management device 505 is achieved by the remote server, correspondingly, the scan verification device 506 may send the optically readable copy to the remote server, and the remote server may perform the extraction of the verification code so as to generate the verification code detection result.

Alternatively, in the case where the verification code management device 505 is included in the tampering detection apparatus 500, verification code extraction is performed locally by the verification code management device 505. If the verification code is detected, then based on the prefix code in the verification code, the verification code management device 505 determines the node (entity) that generated the verification code. And then, a request for the print transaction ID associated with the verification code is sent to the node that generated the verification code.

Alternatively, in the case where the verification code is stored in a distributed manner, the verification code management device 505 carries out verification code extraction locally. If the verification code is detected, it is possible to locally attain the associated print transaction ID on the basis of the verification code by the verification code management device 505.

Thus, it can be seen that the verification code management device 505 is not only a device for generating and assigning a verification code but also a device for detecting and analyzing the verification code and storing the transaction addresses (IDs) associated with the verification code.

The scan verification device 506 may be further configured to generate a print transaction. Here, for example, the print transaction may be inclusive of the print transaction ID of the paper copy, a scan verification result indicating whether the paper copy has been tampered with, and scan operation information. For example, the scan operation information may include but is not limited to the time of the relevant scan operation, the related scanner identification information (e.g., a scanner ID, model, IP address, etc.), the relevant operator identification information (e.g., a name, ID, email address, etc.), the number of scanned copies, the number of scanned pages, the identification information of the entity in which the scan operation is located (such as the name of an institution), etc. For example, when the scan verification result indicates that the paper copy has been tampered with, the scan verification result may further include an instruction about the tampering information, containing which page is missing, which page is replaced, which page is added, and so on.

Similar to the registration transaction and the print transaction described above, the scan verification device 506 sends the generated scan transaction to the distributed data management device 501. And then, the distributed data management device 501 transmits the scan transaction to the other nodes in the distributed data network for review by the other nodes.

Finally, the scan transaction obtaining its required review result is recorded on the distributed data management device 501 in the current node, and is further synchronously recorded in the other nodes of the distributed data network. If a scan transaction obtained its required review result, then it may be regarded that a consensus has been reached among the respective nodes in the distributed data network, and the scan transaction is data that the respective entities can mutually trust. As a result, the data (i.e., the scan transaction) that has been reviewed by each entity and has obtained a consensus of the respective entities is stored in each entity so as to achieve the distributed storage of the data. For example, the required review result may be approval by all the other nodes or a part (e.g., most nodes) of the other nodes. This may be flexibly selected and set according to the specific design requirements. Hence, it can be seen that the distributed storage of the scan transaction is exactly the same as the distributed storage of the registration transaction and the distributed storage of the print transaction set forth.

In addition, alike to the print transaction described above, the scan transaction has a scan transaction ID corresponding to itself. For example, the scan transaction ID may be a logical address. Based on the scan transaction ID, the scan transaction corresponding to this ID may be uniquely retrieved from the recorded data.

Moreover, in order to facilitate the retrieval of the relevant scan transaction in the follow-on paper copy scan process, the verification code may be stored in association with the scan transaction ID. For example, in a case where the verification code management device 505 is achieved by a remote server, after the scan transaction is generated, the scan transaction ID is further sent to the server, and is stored in the server in association with the previously generated verification code. In a case where the verification code management device 505 is contained in the tampering detection apparatus 500, the scan transaction ID is associated with the verification code, and the two are locally stored in the verification code management device 505. Moreover, in a case where the verification code is generated locally, and is stored in a distributed manner, the scan transaction ID is associated with the verification code, and the two are stored in each node of the distributed data network.

A paper copy is produced after a print operation, so there exists a corresponding print transaction. Additionally, in a process of transferring a paper copy among multiple entities (e.g., institutions), multiple times of scan verification may be performed, and multiple scan transactions may be generated. In a cross-entity transfer process of a paper copy, if the entity that received the paper copy wants to track the history of the paper copy, then it is possible to perform scan verification on the paper copy for detecting a verification code, and to acquire both the print transaction ID and the scan transaction ID associated with the verification code by the above-mentioned remote server, the entity that generated the verification code, or the entity that scanned the verification code, for example.

As described above, the print transaction includes the registration transaction address (i.e., the registration transaction ID) of the electronic document to be printed, and the verification code is further stored in association with the scan transaction ID. In this case, when the tampering detection apparatus 500 receives a paper copy, the tampering detection apparatus 500 may perform optical scan on the paper copy so as to obtain a verification code therein. Based on the verification code, its associated registration transaction ID, print transaction ID, and scan transaction ID may be determined. Moreover, based on the registration transaction ID, the print transaction ID, and the scan transaction ID, the corresponding registration transaction, the corresponding print transaction, and the corresponding scan transaction may be obtained, respectively, and the information contained in these transactions may be output on a display for check by a user or output to an external device.

Specifically, based on the verification code, its associated print transaction ID and print transaction may be determined. Then, based on the print transaction, the registration transaction ID of the corresponding electronic document may be determined. Additionally, based on the verification code, its associated scan transaction ID may also be determined. Next, based on the registration transaction ID and the scan transaction ID, the registration transaction and the scan transaction of the electronic document corresponding to the paper copy may be obtained. Finally, the information contained in the registration transaction, the print transaction, and the scanning transaction may be displayed or output.

The tampering detection apparatus 500 may further include a document tracking device (not shown in the drawings) configured to determine, based on the print transaction, the registration transaction ID of the corresponding electronic document; based on the verification code, its associated scan transaction ID; and based on the registration transaction ID and the scan transaction ID, the registration transaction and the scan transaction of the electronic document corresponding to the paper copy.

Moreover, the tampering detection apparatus 500 may further contain a display device (not presented in the drawings) configured to display the information included in the registration transaction, the print transaction, and the scanning transaction. Alternatively, the tampering detection apparatus 500 may further include a communication device (not shown in the drawings) configured to output the information contained in the registration transaction, the print transaction, and the scanning transaction to an external device.

Furthermore, in an example, sending, reading, and receiving the data in the distributed data network need to be authenticated. The tampering detection apparatus 500 may further be inclusive of an authentication device (not presented in the drawings) configured to perform authentication on the distributed data management device 501. After being authenticated, the distributed data management device 501 is allowed to conduct sending, reading, and receiving the data in the distributed data network.

Moreover, as set forth, the transaction data such as the registration transaction data, the print transaction data, and the scan transaction data is managed and stored in the distributed data management device 501. For example, this kind of transaction data may be data stored in the format and structure of blockchain technology. However, the tampering detection apparatus 500 may further include a storage device (not shown in the drawings) configured to store the transaction data such as the registration transaction data, the printing transaction data, and the scan transaction data in a format and structure different from the format and structure of the blockchain technology, so that a user may check the transaction data more easily.

By utilizing the tampering detection apparatus 500 according to this embodiment, the document creation device 502, the print verification device 503, and the scan verification device 506 may carry out a creation operation, a print operation, and a scan operation related to an electronic document, respectively. That is, once an electronic document is created or printed, or a paper copy is scanned, a corresponding transaction, i.e., a registration transaction, a print transaction, or a scan transaction may be recorded in each node of the distributed data network in a manner of distributed storage after a consensus is reached among the respective nodes in the distributed data network. The data in the distributed data network cannot be tampered with, and has obtained a consensus of the respective nodes in the distributed data network. By using such a distributed storage manner, the trust problem in a cross-entity paper copy verification process can be solved, and any tampering with a paper copy can be found in a cross-entity transfer process of the paper copy.

Furthermore, sending, reading, and receiving data in the distributed data network need to be authenticated, and at least one of the multiple entities is allowed to conduct sending, reading, and receiving the data after being authenticated. For example, the authentication may adopt an account password based approach. All the above-described entities that send, read, and receive the registration transaction, the print transaction, and the scan transaction are nodes that have completed authentication.

By making use of this type of authentication approach, for different electronic documents, different nodes in the distributed data network may be allowed to send, read, and receive the related transaction data. Specifically speaking, first, only the authenticated nodes are allowed to send the relevant transactions to the distributed data network; second, it is possible to further control only the authenticated nodes to be able to read and receive the transaction data of the related electronic document. For example, it is supposed that the distributed data network includes a first node to a fifth node, i.e., five nodes in total. For an electronic document and its corresponding paper copy, the first node, the second node, and the third node in the distributed data network may be allowed to read and receive the related data by authentication. For another electronic document and its corresponding paper copy, the second node, the third node, and the fifth node in the distributed data network may be allowed to read and receive the relevant data by authentication.

Moreover, by utilizing this kind of authentication approach, the privacy problem of cross-entity electronic document verification may be solved, and the entities that have authority to send, read, and receive the related transaction data may be flexibly controlled.

In addition, as set forth, by storing a verification code in association with a print transaction ID and a scan transaction ID, all the electronic document related transaction information can be read from the distributed data network, thereby solving the problem of history tracking of an electronic document in a cross-entity transfer process.

Third Embodiment

This embodiment relates to another tampering detection apparatus that corresponds to one of a plurality of entities involved in a paper copy transfer process. The other tampering detection apparatus may include a storage and a processor. The storage is used to store a computer program. The processor is configured to carry out the following processes when executing the computer program stored in the storage, namely, obtaining an optically readable copy of a paper copy; acquiring a verification code detection result of the optically readable copy; if the verification code detection result has no verification code, then determining that the paper copy has been tampered with; and, if the verification code detection result contains a verification code and its associated print transaction ID, then attaining a corresponding print transaction based on the print transaction ID, and comparing the information included in the print transaction with the corresponding information of the optically readable copy so as to determine whether the paper copy has been tampered with. That is, the other tampering detection apparatus may perform the tampering detection method according to the first embodiment.

Here, the other tampering detection apparatus serves as a node in a distributed data network, and is used to send/receive data to/from the other nodes in the distributed data network and to receive/send a review (verification) result with respect to the data from/to the other nodes. The data that obtained its required review result is synchronously saved on each node in the distributed data network. The respective nodes in the distributed data network correspond to different tampering detection apparatuses. The data recorded on each node in the distributed data network is used to check tampering with the data in the other nodes, and contains the print transaction.

Figure 6:
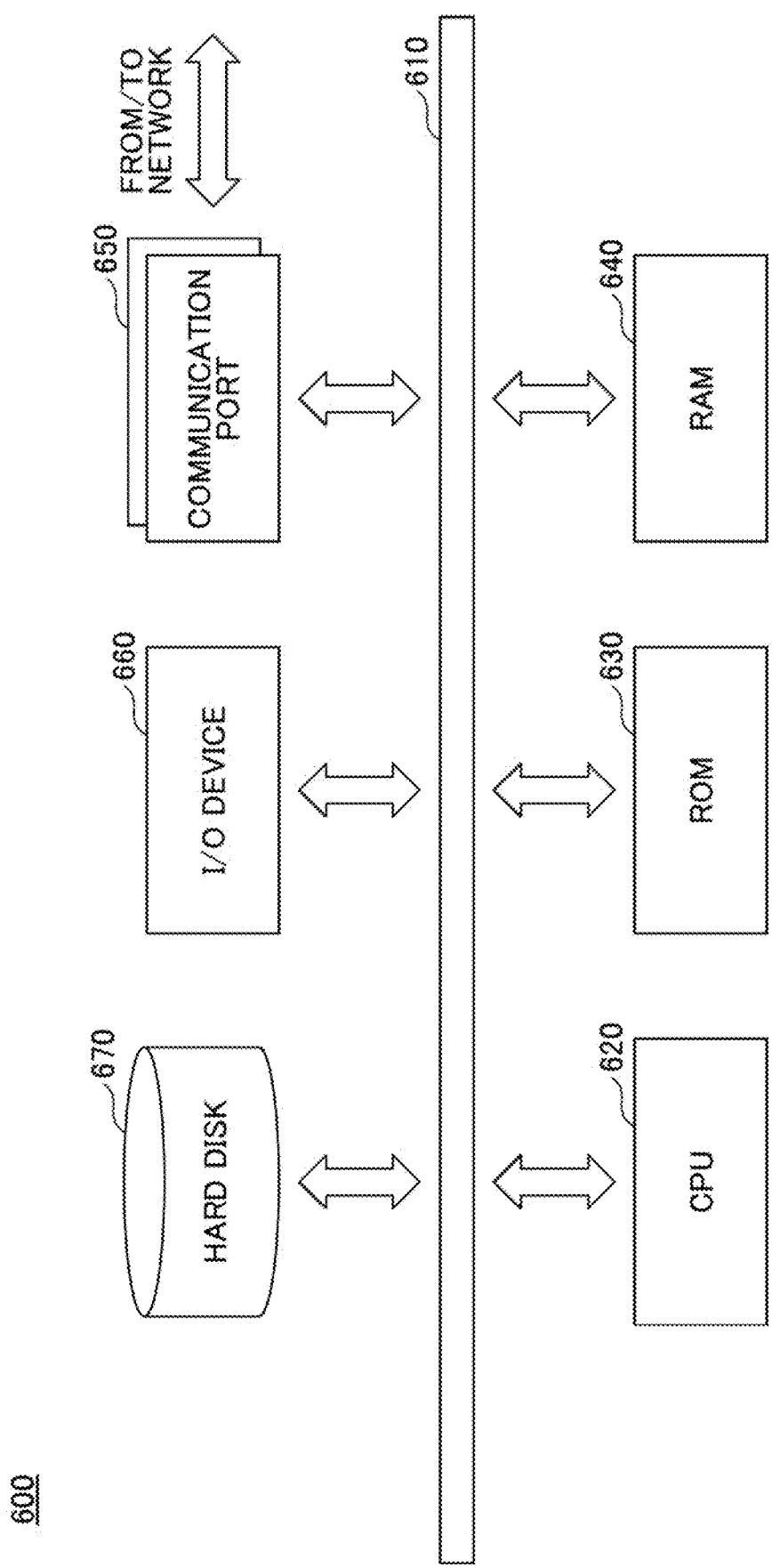
FIG. 6 illustrates a schematic diagram of the architecture of an exemplary computing apparatus in a third embodiment of the present disclosure.

In particular, the other tampering detection apparatus in accordance with this embodiment may also be realized by the architecture of a computing apparatus 600 shown in FIG. 6.

FIG. 6 illustrates a schematic diagram of the architecture of the computing apparatus 600.

As shown in FIG. 6, the computing apparatus 600 may include a bus 610, at least one CPU (Central Processing Unit) 620, a ROM (Read Only Memory) 630, a RAM (Random Access Memory) 640, a communication port 650 capable of being connected to a network, an I/O (Input/Output) device 660, a hard disk 670, etc. Various files, data, and program instructions involved when performing communications and/or the tampering detection method according to the first embodiment may be stored in the ROM 630 or RAM 670. Of course, the architecture of the computing apparatus 600 presented in this drawing is just for illustration, and one or more components in the computing apparatus 600 may be omitted as needed.

Fourth Embodiment

In this embodiment, a computer program and a non-transitory computer-readable storage medium are briefly described as follows.

The computer program may cause a computer to conduct the tampering detection method in accordance with the first embodiment.

Furthermore, the non-transitory computer-readable storage medium may store computer-executable instructions (i.e., the computer program) for execution by a computer including a processor(s) or processing system. The computer-executable instructions, when executed, may render the processor(s) or processing system to perform the tampering detection method according to the first embodiment.

Up to here, the tampering detection method, the tampering detection apparatuses, the computer program, and the non-transitory computer-readable storage medium in accordance with the embodiments have been described in detail. By utilizing the tampering detection method and the tampering detection apparatuses, once an electronic document is created or printed, or a paper copy is scanned, a corresponding transaction, i.e., a registration transaction, a print transaction, or a scan transaction may be recorded on each node of the distributed data network in a manner of distributed storage after a consensus is reached among the respective nodes in the distributed data network. The data in the distributed data network cannot be tampered with, and has obtained a consensus of the respective nodes in the distributed data network. By using this kind of distributed storage, it is possible to solve the problem of trust in a cross-entity paper copy verification process. Moreover, authentication is necessary for sending, reading, and receiving the data in the distributed data network, and at least one of the plurality of entities is allowed, after being authenticated, to perform sending, reading, and receiving the data in the distributed data network. By employing this type of authentication, for different electronic documents, it is possible to permit different nodes in the distributed data network to send, read, and receive the related transaction data. Furthermore, by taking advantage of this kind of authentication, it is also possible to solve the problem of privacy of cross-entity electronic document verification and to flexibly control the entities having authority to send, read, and receive the relevant transaction data. In addition, by storing a verification code in association with a print transaction ID and a scan transaction ID, it is possible to read all the electronic document related transaction information from the distributed data network, thereby solving the problem of history tracking in a cross-entity electronic document transfer process.

Here, it should be noted that the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Because the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any required hardware resources including, for example, a central processing unit (CPU), a random access memory (RAM), and a hard disk drive (HDD). The CPU may include processors of any required type and number. The RAM may include any required volatile or nonvolatile memory. The HDD may include any required nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by those skilled in the art without departing from the basic concept and technical scope of the present disclosure.

The present application is based on and claims the benefit of priority of Chinese Patent Application No. 201910856999.2 filed on Sep. 11, 2019, the entire contents of which are hereby incorporated by reference.

What is claimed is:

1. A tampering detection method applied to one of a plurality of entities involved in a paper copy transfer process, each of the plurality of entities corresponding to a node in a distributed data network, the method comprising:
    obtaining, by a processor, an optically readable copy of the paper copy;
    acquiring, by the processor, a verification code detection result of the optically readable copy;
    determining, by the processor, that the paper copy has been tampered with in response to the verification code detection result containing no verification code;
    obtaining, by the processor, a print transaction corresponding to a print transaction ID, in response to the verification code detection result containing a verification code and the print transaction ID;
    determining, by the processor, whether the paper copy has been tampered with by comparing the verification code and information contained in the print transaction;
    generating, by the processor, a review result indicating whether the paper copy has been tampered with;
    sending, by the processor, the review result to the other nodes;
    recording, by the processor, the review result synchronously with each node in the distributed data network in response to each node independently generating a review result indicating whether the paper copy has been tampered with
    generating, by the processor, a scan transaction containing the print transaction ID of the paper copy, a scan verification result indicating whether the paper copy has been tampered with, and scan operation information, the print transaction containing a registration transaction ID of an electronic document to be printed, corresponding to the paper copy;
    obtaining, by the processor, a registration transaction corresponding to the registration transaction ID;
    storing, by the processor, the verification code in association with a scan transaction ID corresponding to the scan transaction;
    determining, by the processor, based on the print transaction, the registration transaction ID of the electronic document;
    determining, by the processor, based on the verification code, the scan transaction ID associated with the verification code;
    acquiring, by the processor, the registration transaction and the scan transaction of the electronic document, based on the registration transaction ID and the scan transaction ID; and
    displaying or outputting information contained in the registration transaction, the print transaction, and the scan transaction.

2. The tampering detection method according to claim 1, further comprising:
    generating, by the processor, the print transaction in response to a print command, the print command including an electronic document to be printed and a registration transaction ID of the print command;
    obtaining, by the processor, a registration transaction based on the registration transaction ID, the registration transaction corresponding to the registration transaction ID;
    generating, by the processor, the registration transaction when creating the electronic document, the registration transaction including identification information of the electronic document;
    transmitting, by the processor, the registration transaction to the other nodes in the distributed data network to be reviewed; and
    acquiring, by the processor, a review result of the registration transaction from the other nodes.

3. The tampering detection method according to claim 2, further comprising:
    generating the verification code in response to receiving the print command, the verification code indicating consistency of the identification information contained in the registration transaction and the electronic document; and
    embedding the verification code into the electronic document to be printed as the paper copy.

4. The tampering detection method according to claim 3, wherein, the verification code contains a prefix code for identifying the node generating the verification code, and the method further comprises:
    determining, by the processor, based on the prefix code, the node generating the verification code; and
    requesting, by the processor, the print transaction ID stored in association with the verification code from the node generating the verification code.

5. The tampering detection method according to claim 3, further comprising:
    transmitting, by the processor, the verification code to the other nodes in the distributed data network for review by the other nodes.

6. The tampering detection method according to claim 1, further comprising:
    sending, by the processor, the scan transaction to the other nodes in the distributed data network for review by the other nodes,
    receiving, by the processor, a review result of the scan transaction; and
    acquiring, by the processor, the scan transaction corresponding to the scan transaction ID.

7. The tampering detection method according to claim 1, further comprising:
    allowing, by the processor, at least one of the plurality of entities to perform sending, reading, and receiving data in the distributed data network, in response to authenticating the entity.

8. The tampering detection method according to claim 1, wherein the recording the review result includes recording whether a majority of the nodes determined that the paper copy has not been tampered with.

9. A non-transitory computer-readable storage medium including computer-executable instructions for execution by a processing system, wherein, the computer-executable instructions, when executed, cause the processing system to perform the tampering detection method according to claim 1.

10. A tampering detection apparatus corresponding to one of a plurality of entities involved in a paper copy transfer process, wherein, each of the plurality of entities corresponds to a node in a distributed data network, and respective nodes in the distributed data network correspond to different tampering detection apparatuses, the tampering detection apparatus corresponding to one of the plurality of entities comprising:

a processor configured to obtain an optically readable copy of a paper copy of an electronic document, acquire a verification code detection result of the optically readable copy, determine that the paper copy has been tampered with in response to verification code detection result containing no verification code, obtain a print transaction ID associated with the verification code, in response to the verification code detection result containing a verification code and the print transaction ID, the print transaction corresponding to the electronic document based on the print transaction ID, determine whether the paper copy has been tampered with by comparing the verification code and information contained in the print transaction, generate a review result indicating whether the paper copy has been tampered with, send the review result to the other nodes in the distributed data network, and record the review result synchronously with each node in the distributed data network in response to each node independently generating a review result indicating whether the paper copy has been tampered with, generate a scan transaction containing the print transaction ID of the paper copy, a scan verification result indicating whether the paper copy has been tampered with, and scan operation information the print transaction containing a registration transaction ID of an electronic document to be printed, corresponding to the paper copy, obtain a registration transaction corresponding to the registration transaction ID, store the verification code in association with a scan transaction ID corresponding to the scan transaction, determine, based on the print transaction, the registration transaction ID of the electronic document, determine, based on the verification code, the scan transaction ID associated with the verification code, acquire the registration transaction and the scan transaction of the electronic document, based on the registration transaction ID and the scan transaction ID, and display or output information contained in the registration transaction, the print transaction, and the scan transaction.

11. The tampering detection apparatus according to claim 10, wherein the review result includes an indication as to whether a majority of the nodes determined that the paper copy has not been tampered with.

12. A tampering detection apparatus corresponding to one of a plurality of entities involved in a paper copy transfer process, comprising:

a storage storing computer-executable instructions; and a processor connected to the storage, wherein, the computer-executable instructions, when executed, cause the processor to implement obtaining an optically readable copy of a paper copy;

acquiring a verification code detection result of the optically readable copy;

determining that the paper copy has been tampered with in response to the verification code detection result containing no verification code;

obtaining a print transaction corresponding to a print transaction ID in response to the verification code detection result containing a verification code and the print transaction ID;

determining whether the paper copy has been tampered with by comparing the verification code and information contained in the print transaction;

generating a review result indicating whether the paper copy has been tampered with;

sending the review result to the other nodes; and recording the review result synchronously with each node in response to each node independently generating a review result indicating whether the paper copy has been tampered with;

generating a scan transaction containing the print transaction ID of the paper copy, a scan verification result indicating whether the paper copy has been tampered with, and scan operation information, the print transaction containing a registration transaction ID of an electronic document to be printed, corresponding to the paper copy;

obtaining a registration transaction corresponding to the registration transaction ID;

storing the verification code in association with a scan transaction ID corresponding to the scan transaction;

determining, based on the print transaction, the registration transaction ID of the electronic document;

determining, based on the verification code, the scan transaction ID associated with the verification code;

acquiring the registration transaction and the scan transaction of the electronic document, based on the registration transaction ID and the scan transaction ID; and displaying or outputting information contained in the registration transaction, the print transaction, and the scan transaction.

13. The tampering detection apparatus according to claim 12, wherein the review result includes an indication as to whether a majority of the nodes determined that the paper copy has not been tampered with.

\* \* \* \* \*